United States Patent [19]

van den Goor

[11] Patent Number: 4,502,593
[45] Date of Patent: Mar. 5, 1985

[54] CONVEYOR FACILITY

[75] Inventor: Jakobus M. van den Goor, Eindhoven, Netherlands

[73] Assignee: Lear Siegler, Inc., Grand Rapids, Mich.

[21] Appl. No.: 410,369

[22] Filed: Aug. 23, 1982

[30] Foreign Application Priority Data

Aug. 26, 1981 [NL] Netherlands .................. 8103958

[51] Int. Cl.³ .............................................. B65G 13/06
[52] U.S. Cl. ..................................... 198/781; 198/790
[58] Field of Search ............... 198/781, 782, 783, 790, 198/809

[56] References Cited

U.S. PATENT DOCUMENTS

| | | | |
|---|---|---|---|
| 3,253,697 | 5/1966 | DeGood et al. | 298/781 |
| 3,420,356 | 1/1969 | DeGood | 198/781 |
| 3,612,248 | 10/1971 | Wallis | 198/781 |
| 3,854,576 | 12/1974 | Bowman | 198/809 X |
| 4,164,280 | 8/1979 | Duttine et al. | 198/781 |
| 4,221,288 | 9/1980 | Rae | 198/781 |
| 4,318,468 | 3/1982 | Bodewes et al. | 198/718 |

FOREIGN PATENT DOCUMENTS

| | | | |
|---|---|---|---|
| 2013847 | 10/1971 | Fed. Rep. of Germany | 198/790 |
| 7903711 | 11/1980 | Netherlands | 198/781 |
| 7903712 | 11/1980 | Netherlands | 198/781 |

Primary Examiner—Joseph E. Valenza
Assistant Examiner—Jonathan D. Holmes
Attorney, Agent, or Firm—Price, Heneveld

[57] ABSTRACT

The specification discloses a conveyor facility including a continuously moving drive belt having upper and lower parts and a plurality of selectively rotatable control elements supported between the upper and lower drive belt parts. Each control element includes a peripheral configuration causing the elements to rotate in a transportation mode and remain stationary in an accumulation mode. Further included are vertically reciprocable pressure rollers for selectively lifting the lower part of the drive belt into engagement with stationary control elements to cause those elements to again rotate.

2 Claims, 9 Drawing Figures

CONVEYOR FACILITY

BACKGROUND OF THE INVENTION

The invention concerns a conveyor facility equipped with a frame and a flexible drive element continuously movable during operation. The drive element extends generally parallel to the surface over which the articles to be conveyed move and co-operates with control elements which rotate around rotating shafts for the direct or indirect transmission of driving force from the drive element to the articles to be moved. Each control element rotating around a rotating shaft includes at least one circumferential part extending concentrically around the rotating shaft and a second circumferential part lying at a shorter distance from the rotating shaft than the first circumferential part.

In such a conveyor facility, if an article moved along the facility comes to a stop at a particular place on the facility, the control element or elements in the proximity of the article come to rest with the second circumferential part of the control element turned toward the flexible drive element so that the flexible drive element will exercise virtually no further driving force on the article. The drive element is thereby no longer brought into driving contact with the parts to be driven by the driving element at that place.

In order to set the control element(s) in motion again after the resistance which has brought the article to a halt is removed, conveyor facilities customary hitherto include ridges fitted in the driving element which act with a jolt on the control elements to cause the elements to again rotate. This approach typically works adequately, but in certain cases the disadvantage may arise that when using this approach the control element(s) are returned to rotation from the rest state relatively slowly.

SUMMARY OF THE INVENTION

The present invention is a conveyor facility of the above kind in which each stationary control element is returned to rotation rapidly and effectively.

According to a first aspect of the invention, means are included for exercising a positive continuous driving force on the first circumferential part of the control element when the control element is at rest or stationary. More particularly, a positive continuous driving force of this kind can be achieved in a simple way by including lifting means for causing the return part of the flexible driving element, which takes the form of an endless belt, to grip the control element.

According to a second aspect of the invention, the center of gravity of the control element, when the second circumferential part is turned towards the flexible driving element, lies next to the vertical plane through the rotating shaft of the control element; and shifting means are included for moving the control element in a direction downwards from the flexible driving element. When the stationary control element is to be rotated, the control element is moved slightly downwards for a short period only, whereby, as a result of the eccentric location of the center of gravity, the control element will rotate. As a result of this rotation of the control element, the first circumferential part of the control element extending concentrically around the rotating shaft grips the flexible driving element, so that the flexible driving element exercises a positive continuous driving force on the control element and will cause the control element to rotate immediately in the desired way.

The invention will now be further explained by means of several embodiments of the invention shown in the following figures.

DETAILED DESCRIPTION OF THE PREFERRED EMBODIMENT

Figure 1:
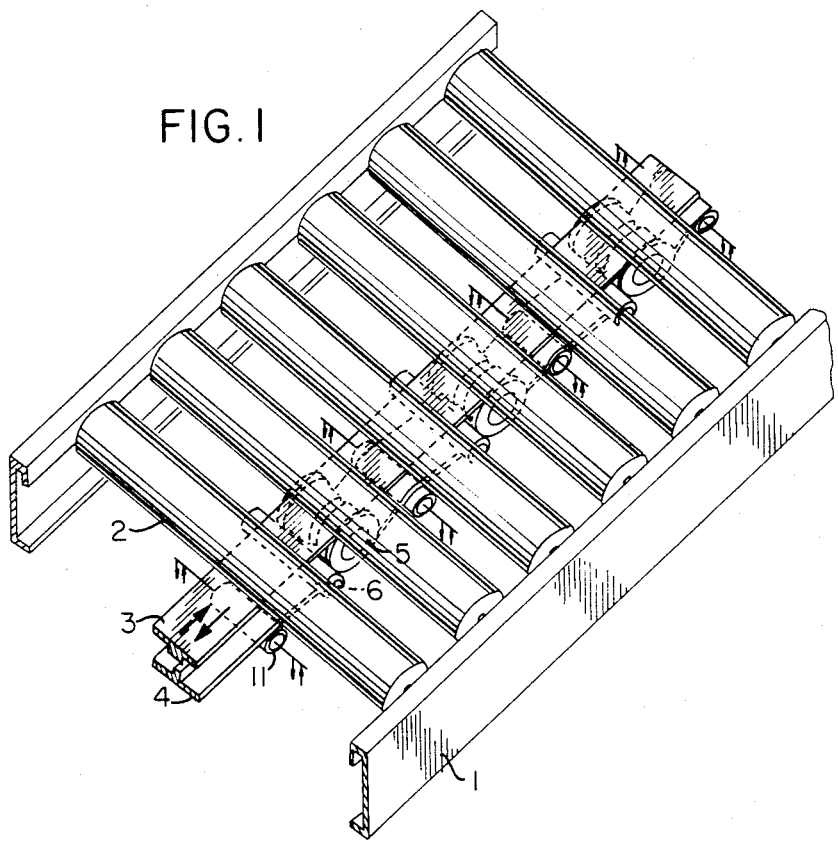
FIG. 1 is a perspective view of a part of a conveyor facility according to the present invention.
Figure 2:
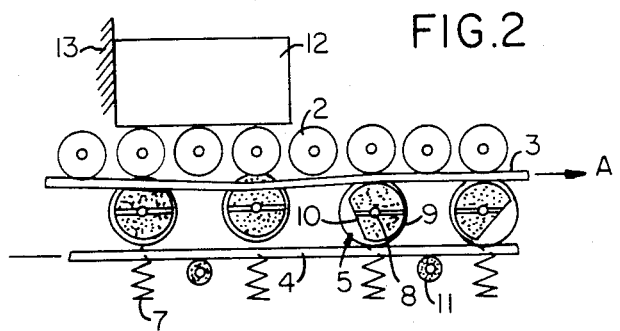
FIG. 2 is a cross-section through a part of the conveyor facility shown in FIG. 1.
Figure 3:
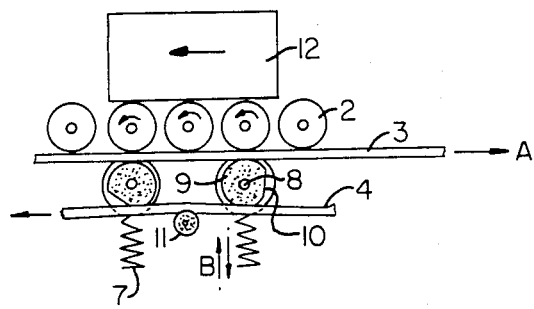
FIG. 3 is a cross-section corresponding to FIG. 2, in which certain parts of the conveyor facility are in a different position than shown in FIG. 2.

The conveyor facility shown in FIG. 1 includes a frame 1, in which a number of rollers 2 are rotatably mounted parallel to each other. These rollers 2 (FIGS. 2 and 3) are driven with the aid of the upper part 3 of a flexible driving element forming an endless belt, the lower part 4 of which is essentially parallel to and beneath the upper part 3. The flexible driving element can be driven in a conventional manner with the aid of driving devices (not shown) so that the upper part 3 moves in the direction of the arrow A.

Control elements 5 (FIGS. 2 and 3) are fitted at regular distances from each other beneath the upper part 3 of the belt, suspended in the frame with the aid of carriers 6 (see FIG. 1) to shift up and down. Carriers 6 are operatively supported on springs 7. Embodiments of a design of this kind are described in greater detail in Dutch Patent Application No. 7903711 and U.S. Pat. No. 4,318,468, issued Mar. 9, 1982, to Bodewes et al, entitled CONVEYOR DEVICE. Each control element 5 rotates around a rotating shaft 8 oriented parallel to the rollers 2 and is provided with a first circumferential part 9 extending concentrically about this rotating shaft. Each control element 5 is further provided with a second circumferential part 10 which is straight so that the second circumferential part 10 lies at a smaller distance from the rotating shaft 8 of the control element 5 than the first circumferential part 9 extending concentrically around the rotating shaft.

Pressure rollers 11 (FIGS. 2 and 3) are located at regular distances from each other beneath the lower part 4 of the flexible driving element. The height of the rollers 11 can be adjusted upwards and downwards as indicated by the double arrow B (see FIG. 3) in a conventional manner (not shown).

During normal operation (FIG. 3), the upper part 3 of the belt will move in the direction of the arrow A, while the control elements 5, which are pressed upwards by the springs 7, will rotate around their rotating shafts 8 since the first circumferential part 9 of each control element contacts the upper part 3 and accordingly presses the upper part against the rollers 2, so that the rollers 2 rotate counterclockwise. The second circumferential part 10 of each control element 5, lying closer to the rotating shaft 8 than the first circumferential part 9, does not thereby make any effective contact with the underside of the upper part 3 of the belt; but this does not interrupt the normal drive of the rollers 2 since rotation of the control elements 5 continues to be sustained by the inertia of the control elements. Consequently, the upper part 3 of the belt, will retain a driving relation with the carrier rollers 2. In this way, articles 12 supported by the carrier rollers 2 are moved to the left.

If an article 12 (FIG. 2) is held back or accumulated (e.g., with the aid of a stop element 13 or by an article ahead of it), the control elements 5 located level with or under the article continue to be turned through the continuously moving upper part 3 of the canvas belt to a position in which the second circumferential part 10 of the control elements are oriented essentially parallel to the upper part of the belt. For this purpose, the carriers 6 are generally pressed downwards with the aid of a sensing device which observes the presence of the stationary article. The upper part 3 of the belt then moves freely between the undersides of the carrier rollers 2 supporting the stationary article 12 and the second circumferential parts 10 of the stationary control elements 5 oriented parallel to the upper part.

If the hindrance to forward movement of the article 12 is withdrawn (e.g., by removing the stop 13), the stationary control elements 5 are again made to rotate. This is effectively and rapidly achieved by moving that part of the under part 4 of the belt lying beneath the stationary control elements upwards into the position shown in FIG. 3 with the aid of one or more of the vertically reciprocable pressure rollers 11. The under part 4 grips the first circumferential parts 9 extending concentrically around the rotating shafts 8 of the stationary control elements 5 and exercises a positive continuous driving force on the elements as long as this under part continues to be in contact with the first circumferential parts 9 with the aid of the pressure rollers 11. In practice, this is necessary for a brief period only, since the driving elements 5 need be rotated only through a small angle, with the aid of the under part 4 of the belt, in order to cause the first circumferential parts 9 projecting concentrically around the rotating shafts 8 of the control elements 5 to make contact again with the upper part 2 of the belt to be further driven by this upper part. In this way, the stationary control elements 5 are caused to again rotate very quickly.

The pressure rollers 11 can, if necessary, be linked (not shown) to the stop element 13 holding back the article 12 so that displacement of the stop element from the trajectory of the article 12 will lead to a brief upward movement in the pressure roller(s) 11 concerned so as to exercise a brief positive driving force on the control elements 5 in question.

Second Embodiment

Figure 4:
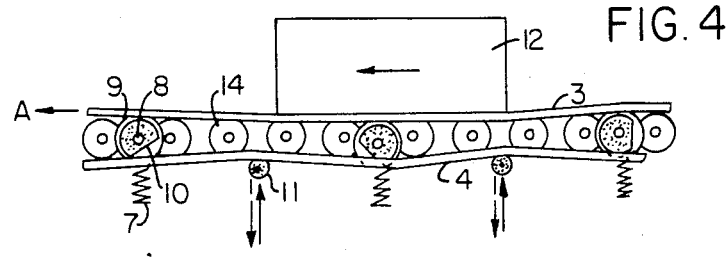
FIG. 4 is a cross-section corresponding to FIG. 2 of a second embodiment of the conveyor facility.
Figure 5:
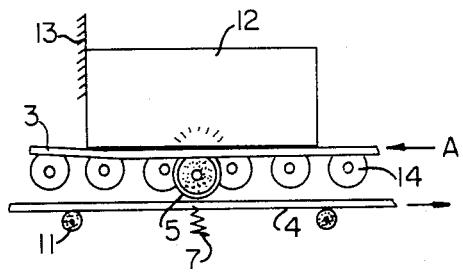
FIG. 5 is a cross-section corresponding to FIG. 4 in which certain parts of the conveyor facility are in a different position than shown in FIG. 4.

In the embodiment described above, the articles 12 to be moved are driven from the flexible driving element 3, 4 by means of carrier rollers 2 fitted between the article and the driving element. However, as shown in FIGS. 4 and 5, the present invention can also be applied to a conveyor facility where the articles 12 to be moved enter into direct contact with the flexible driving element. In FIGS. 4 and 5, those parts which correspond with the parts in the embodiment of FIGS. 1 and 3 bear the same reference numerals.

Third Embodiment

In this embodiment (FIGS. 6 and 7), a mass 15 possessing a certain weight is fitted to each control element at some distance from the rotating shaft 8 so that, when a control element 5 is in the position in which the second circumferential part 10 lies against the under surface of the upper part 3 of the drive belt (FIG. 6), the center of gravity of the control element lies next to or is offset from the vertical plane through the rotating shaft 8 of the control element. Conventional means (not shown) are included for moving the control element 5 downwards against the force of spring 7.

If a stationary control element 5 (FIGS. 6 and 7) is to be again made to rotate, this control element is moved downwards briefly with the aid of the conventional means (not shown) whereby, under the effect of the eccentric location of the center of gravity of the control element, this control element will turn counterclockwise through a certain angle, whereupon the circumferential part 9 of this control element extending concentrically around the rotating shaft 8 enters into contact with the underside of the upper part 3 of the driving element, whereby a positive and continuous driving force is immediately exercised on this control element.

The means (not shown) for briefly moving the control element(s) downwards can be linked to a stop element 13.

Fourth Embodiment

Figure 6:
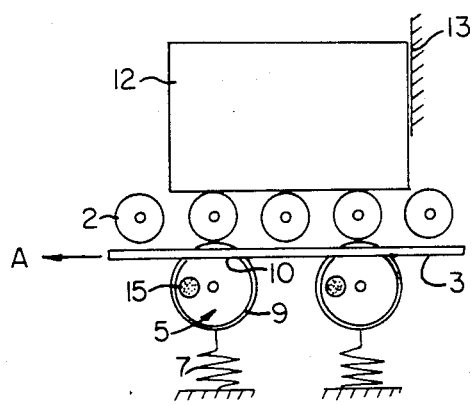
FIG. 6 is a cross-section through a third embodiment of the conveyor facility.
Figure 7:
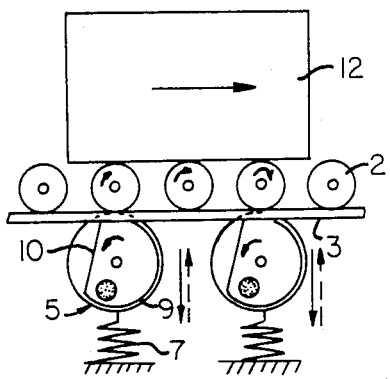
FIG. 7 is a cross-section corresponding to FIG. 6 in which certain parts of the conveyor facility are in a different position than shown in FIG. 6.
Figure 8:
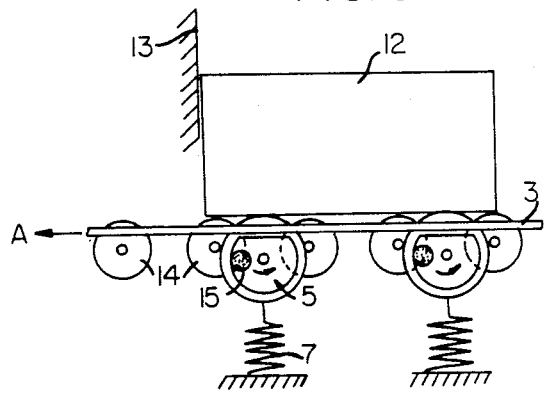
FIG. 8 is a cross-section through a fourth embodiment of the conveyor facility.
Figure 9:
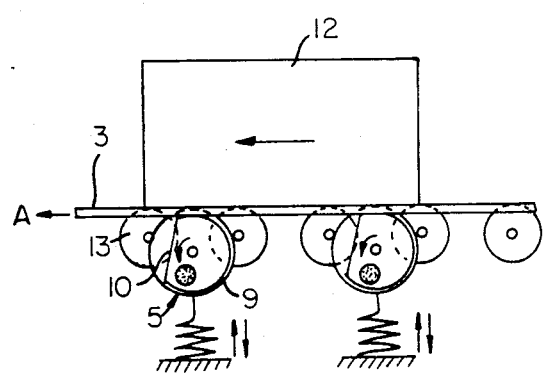
FIG. 9 is a cross-section corresponding to FIG. 8 in which certain parts of the conveyor facility are in a different position than shown in FIG. 8.

FIGS. 8 and 9 illustrate an embodiment of the invention corresponding to that embodiment of FIGS. 6 and 7 but in which the articles 12 to be moved are not driven by the driving element via the supporting rollers 2 but enter into direct contact with the upper part 3 of the driving element as explained above in conjunction with the embodiment shown in FIGS. 4 and 5. The components of the embodiment according to FIGS. 8 and 9 are provided with the same reference numerals as the corresponding components of the embodiments described above. The operation of this embodiment is clear in view of the above descriptions and therefore needs no further explanation.

The embodiments of the invention in which an exclusive property or privilege is claimed are defined as follows:

1. A conveyor facility comprising:
   a frame defining an article transportation surface;
   an endless flexible drive element continuously movable during operation, said drive element including upper and lower parts oriented generally parallel to said article support surface;
   a plurality of control elements each rotatably supported on a shaft between said upper and lower parts of said drive element, resilient means individually supporting each of said control elements for vertical movement in response to changes in conveyor operation between transport and accumulation each of said control elements including a first circumferential part concentric with said shaft and a second circumferential part at a shorter distance from said shaft than said first circumferential part; and lift means beneath the lower part, the lift means being normally lowered to retracted position and responsive to removal of an article movement restraint for selectively and temporarily shifting said lower part of said continuously movable drive element upwardly into engagement with said first circumferential parts of said control elements when said control elements are stationary and the restraint is removed to cause said control elements to rotate, said lift means lowering said lower part to disengage said control element when their rotation has been reinstated.

2. A conveyor facility as defined in claim 1 wherein said lift means comprises vertically reciprocable pressure rollers below said lower part of said driving element.

* * * * *